(12) United States Patent
Martin

(10) Patent No.: US 7,109,958 B1
(45) Date of Patent: Sep. 19, 2006

(54) SUPPORTING CIRCUITRY AND METHOD FOR CONTROLLING PIXELS

(75) Inventor: Russel A. Martin, Menlo Park, CA (US)

(73) Assignee: Silicon Image, Sunnyvale, CA (US)

( * ) Notice: Subject to any disclaimer, the term of this patent is extended or adjusted under 35 U.S.C. 154(b) by 0 days.

(21) Appl. No.: 10/047,772

(22) Filed: Jan. 15, 2002

(51) Int. Cl.
*G09G 3/36* (2006.01)

(52) U.S. Cl. .......................... 345/87; 345/613; 345/90
(58) Field of Classification Search .................. 345/87, 345/84, 90–102, 74, 690, 613, 694–696; 349/74, 153, 73, 154
See application file for complete search history.

(56) References Cited

U.S. PATENT DOCUMENTS

| | | | | |
|---|---|---|---|---|
| 5,854,616 A | * | 12/1998 | Ota et al. .................. | 345/100 |
| 2002/0047822 A1 | * | 4/2002 | Senda et al. | |
| 2002/0118184 A1 | * | 8/2002 | Yeon et al. | |
| 2002/0149556 A1 | * | 10/2002 | Matsueda | |
| 2003/0034992 A1 | * | 2/2003 | Elliott et al. | |
| 2003/0103058 A1 | * | 6/2003 | Elliott et al. | |
| 2003/0117423 A1 | * | 6/2003 | Elliott et al. | |
| 2004/0046714 A1 | * | 3/2004 | Elliott | |

* cited by examiner

*Primary Examiner*—Regina Liang
*Assistant Examiner*—Jennifer T. Nguyen
(74) *Attorney, Agent, or Firm*—Perkins Coie LLP

(57) ABSTRACT

In a pixel display there is disclosed a pixel arrangement for LCD displays having 5 subpixel components. Namely, red, blue, green with adjacent red green pixels bordered by blue subpixels. Circuitry is disclosed for such pixels in which capacitors, functioning in sample hold circuits receive pulses to their terminal immediately after transistors are open with the resulting voltage change there occurring as an unintended voltage signal being applied to an LCD cell thereby causing unintended image artifacts. A new circuit and method is disclosed by which no transistor is open without its sample and hold stable for the remainder of the frame. Thus, preceding gate lines are tied through subsequent transistors such that all transistors open after the capacitors have their reference terminal stablized. In this way, leakage current does not occur through the source and drain of the transistors attended and certain subpixels do not have unintended image artifacts present.

42 Claims, 6 Drawing Sheets

(Gate1)

(Gate2)

(Gate3)

(Gate4)

SUPPORTING CIRCUITRY AND METHOD FOR CONTROLLING PIXELS

CROSS-REFERENCE TO RELATED APPLICATION(S)

This application is related to U.S. patent application No. 10/016,247, filed Dec. 10, 2001, entitled "METHOD AND SYSTEM FOR SPATIAL-TEMPORAL DITHERING FOR DISPLAYS WITH OVERLAPPING PIXELS" which is hereby incorporated by reference in its entirety.

FIELD OF THE INVENTION

This invention relates to visual displays. More particularly, this invention relates to a circuitry for controlling the display of information via a display.

BACKGROUND

Over the years as computer and related displays have evolved, a need has arisen to convey information on such displays with greater accuracy and clarity, particularly in the field of color displays. Digital information on such display have traditionally been displayed via cathode ray tubes ("CRT") and, as technology progressed, liquid crystal displays ("LCDs") and plasma screen display. Either with a CRT, LCD or plasma screen, digital information is conveyed at a display by way of a pixel. Each pixel has subcomponents (i.e., red, green, and blue) which are also called "subpixels." Various hardware associated with actuating selected desired pixels and subpixels have evolved over the years in an attempt to keep pace with the need and demand for greater clarity and accuracy in conveying displayed information. Liquid crystal display technology in particular has also become more widespread in view of the increased clarity that such displays provide with respect to LCDs, economy of size, as well as other advantages.

Drawbacks, however, have existed in the prior art. Pixels have typically been divided into vertically disposed red green and blue subpixel lines. This arrangement, however, has had drawbacks in that the human eye does not perceive the color blue with the same clarity as the color red and green, due to a lack of blue receptor sites within the human eye. Various attempts have been made at restructuring the subpixel arrangement of the LCD pixels with the idea in mind of achieving greater clarity and taking into account the human realities of perception. One such arrangement has been proposed by ClairVoyante Labs.

Even with such structure, however, several drawbacks and problems still exist. Correcting image display problems with attendant supporting circuitry has been attempted, however, such attempts have not produced solutions to many display problems. For example, there remain undesirable image artifacts with such displays, such as losing contrast on every other line, creating undesirable patterns as well a general loss of contrast in the image resulting in non-uniformities of the image depending upon various transient conditions which vary with the imaging process. As such, it would be desirable to provide supporting circuitry which would lend itself to more accurately actuating visual displays, e.g. liquid crystal displays without the undesirable image artifacts and the unintended poorer image quality conditions. The present invention provides a solution to such drawbacks and overcomes many problems associated with poor image display.

DETAILED DESCRIPTION

Figure 1:
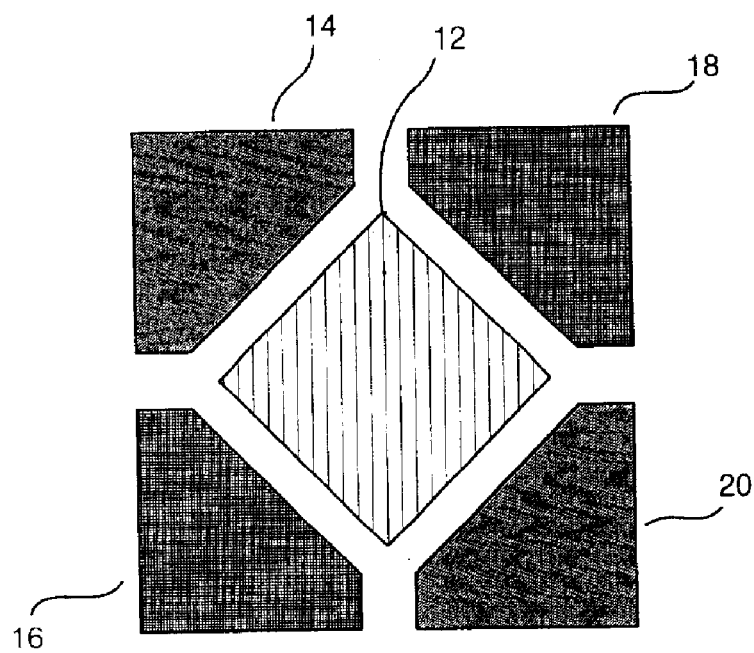
In FIG. 1 there is shown a pixel arrangement having five subpixels.

In FIG. 1 there is shown a pixel matrix structure in which a group of subpixels are arranged in a group of five. Such a matrix is proposed by ClairVoyante Labs. It will be appreciated that this pixel structure is organized in rows in a display and is progressively scanned in order to actuate the display. In this structure, the subpixel arrangement includes a generally central 12 generally rectangular subpixel with pentagonal shaped subpixels 14, 16, 18 and 20, disposed about the rectangular subpixel. The subpixel 12 is preferably substantially blue, while subpixels 14 and 20 are generally substantially red in color. Subpixels 18 and 16 are generally substantially green in color. It will be appreciated that different color subpixels are actuated in order to create different selected desired colors. Subpixel 12, being generally blue in color, is bordered by pixels 14, 16, 18 and 20 in order to provide greater perceived visual clarity. Thus, in this arrangement there are five subpixels with a blue generally central subpixel being bordered by juxtaposed generally red and green pixels. As compared to earlier pixel arrangements, this reduces the proportional amount of blue subpixels required, this reducing the number of interconnections without decreasing the perceived sharpness of the images.

Figure 2:
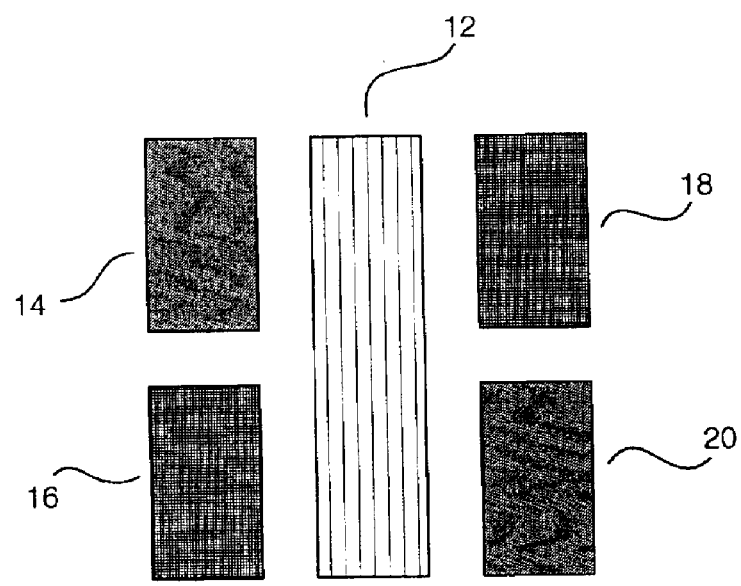
In FIG. 2 there is shown a pixel arrangement having five subpixels.

Additional matrixes have been used in which the subpixels have different geometric shapes, such as shown in FIG. 2, in which red subpixels 14 and 20 and green subpixels 16 and 18 are disposed adjacent about blue subpixel 12. It will be appreciated that other geometric shapes other than shown in FIGS. 1 and 2 may also be employed. Such a matrix is also proposed by ClairVoyante Labs.

Figure 3:
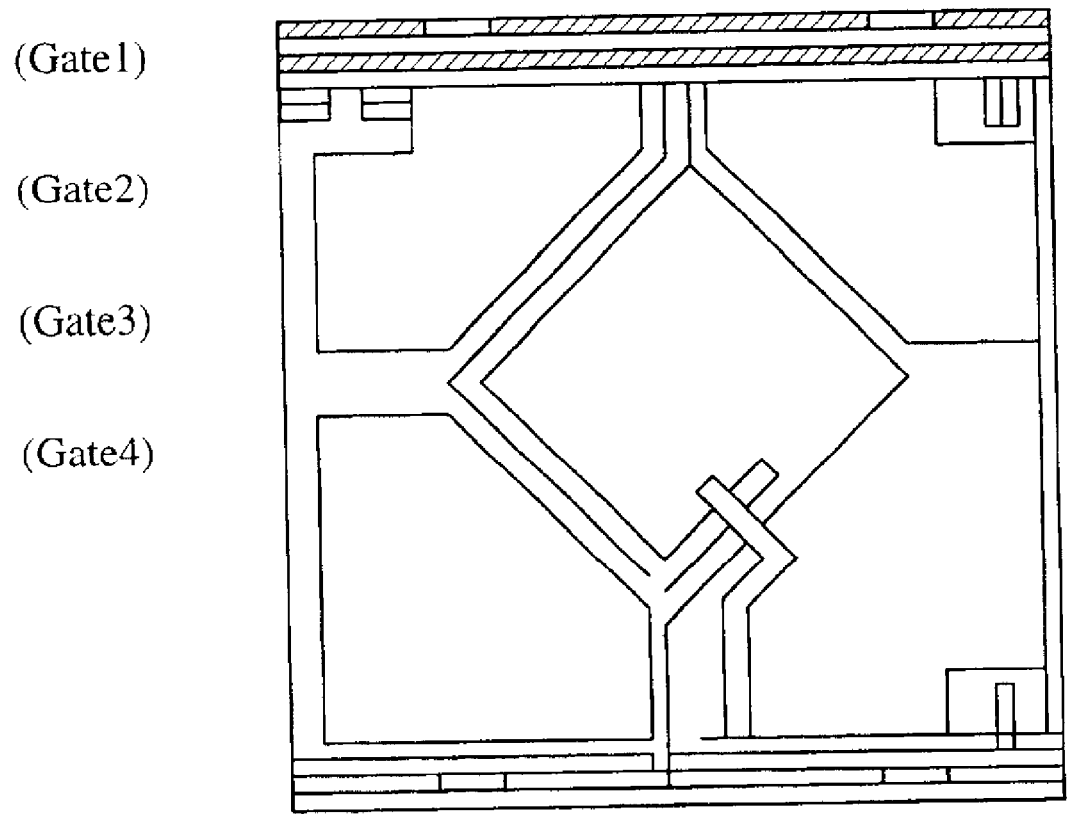
In FIG. 3 there is shown an integrated circuit layout cross-sectional top plain view of an integrated circuit pixel arrangement.

Turning now to FIG. 3, there is shown a top structural view of a capacitor formed by the pixel electrode forming the dialectric of the capacitor and liquid crystal back plane (BP) the liquid crystal material view of the FIG. 1 as an integrated thin film circuit with LCD subcells 34, 43, 51, 56 and 60 integrated with thin film transistors 30, 44, 48, 54, 62 and capacitors 32, 46, 47, 52 and 58.

Each subpixel has a storage capacitor and thin film transistor associated with it. Thus, subpixel 14 has transistor 30 and storage capacitor 32. Subpixel 16 has transistor 44 and capacitor 47 associated therewith. Subpixel 18 has transistor 48 and a capacitor 46. Subpixel 12 has transistor 62 and storage capacitor 58. Subpixel element 20 has a transistor 54 and a capacitor 52. The storage capacitor and transistor arrangement act as a sample and hold circuit as will be described in more detail with respect to the schematic representation of the integrated circuit. The thin film transistors act as switches conveying a data signal (on or off) by way of data lines (not shown) to the selected desired subpixel element. Gate lines 40 (Gate 1), 42 (Gate 2), 57 (Gate 3), 49 (Gate 4) apply control pulses to the aforereferenced transistors and capacitors.

Figure 4:
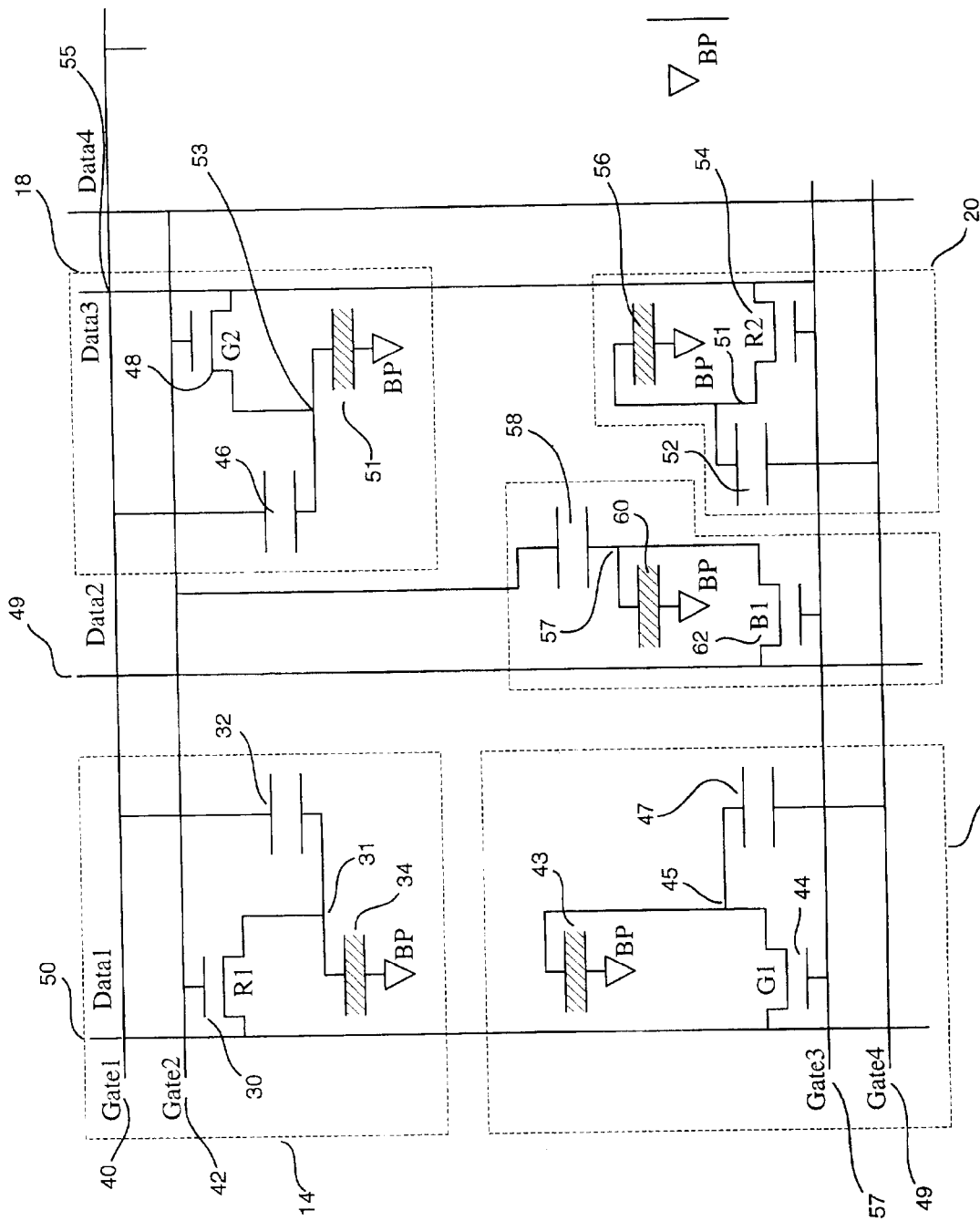
In FIG. 4 there is shown a circuit diagram of the layout shown in FIG. 3.

The schematic of this structure is represented in FIG. 4. The operation thereof is described in conjunction with the timing diagram of FIG. 5. With respect to the circuit portion associated with red subpixel element 14, a control pulse is sent via gate line 40 (Gate 1) between $t_0$ and $t_1$. That pulse is applied to one terminal of storage capacitor 32. This voltage is dropped across storage capacitor 32 and LCD subcell 34. The pulse in these types of operations is quite high, typically on the order of 25 volts. On the order of five volts is dropped across storage capacitor 32 with the resultant approximately 20 volts still applied at node 31. Other values may be applied and the voltages described herein may be higher or lower. This creates in turn, a voltage across the source and drain of thin film transistor 30 (R1) which in turn, causes a resultant current flow through the transistor. This current flow changes the voltage drop across the liquid crystal cell 34. However, when the next signal is applied by way of line 42 (Gate 2), at the gate of transistor 30, it opens and the data signal applied by line 50 (Data 1) flows through transistor 30 and nullifies the effect of any leakage current on cell 34.

Similarly, with respect to the circuitry relevant to green subpixel 18, storage capacitor 46 is coupled to line 40 (Gate 1) which, in turn, delivers a pulse also between $t_0$ and $t_1$ which is applied to one electrode of storage capacitor 46 resulting in a voltage change of approximately 20 volts at node 53. This also causes a leakage current and a voltage change at node 53. However, when line 42 (Gate 2) thereafter applies a subsequent pulse between $t_1$ and $t_2$ to the gate at transistor 48, this transistor opens and a data signal via data line 55 nullifies the voltage created by the leakage current.

With respect to the circuit component associated with blue subpixel component 12, storage capacitor 58 receives gate signal 42 (Gate 2) between $t_1$ and $t_2$ thereby causing a voltage drop across storage capacitor 58 and LCD cell 60 with a similarly high voltage potential at node 61. A signal from gate line 57 (Gate 3) thereafter opens transistor 62 between $t_2$ and $t_3$, which in turn, allows the data signal from data line 49 (Data 2) to flow through transistor 62, to LCD cell 60, thereby also correcting the voltage.

However, with respect to the circuitry supporting subpixel 16 and 20 (G1 and R2) a different result occurs. The transistor 44 is tied to control line 57 (Gate 3) while the storage capacitor of each subpixel (47 and 52, respectively) is tied to control line 49 (Gate 4) which applies a voltage pulse to the storage capacitor in the time period immediately before the transistor has been opened. As such, the voltage applied by lines 57 and 49 does in fact cause a voltage drop at nodes 45 and 53 due to resultant leakage current. However, because there was a previously applied gate signal, and the data signal from date lines 50 and 55 have already been sent, the leakage current and resultant voltage change, in turn, causes an unintended distorted signal to be applied to LCD subcells 43 and 56 thereby resulting in unintended image artifacts and resultant poorer image quality.

Due to the arrangement of the five subpixel arrangement of FIGS. 1 and 2, it will be noted from FIG. 3 that the gate lines are arranged in pairs. Gate lines are paired when they run between two subpixels, (i.e. do not overlap the pixel electrode). As such, the first to be addressed of the gate lines is coupled to the gate of a particular subpixel cells transistor. This leaves a subsequent gate line for connection to the other electrode of the storage capacitor, in other words, the electrode not connected to the LCD cell. Thus, accordingly, as shown in FIG. 4, the two lower subpixels circuit portion, namely 16 and 20, have a storage capacitors coupled to the gates of the following pixel gate line. This follows the format of a five pixel arrangement as shown in FIGS. 1 through 3, but causes the previously described problems and aforereferenced visual artifacts.

Figure 5:
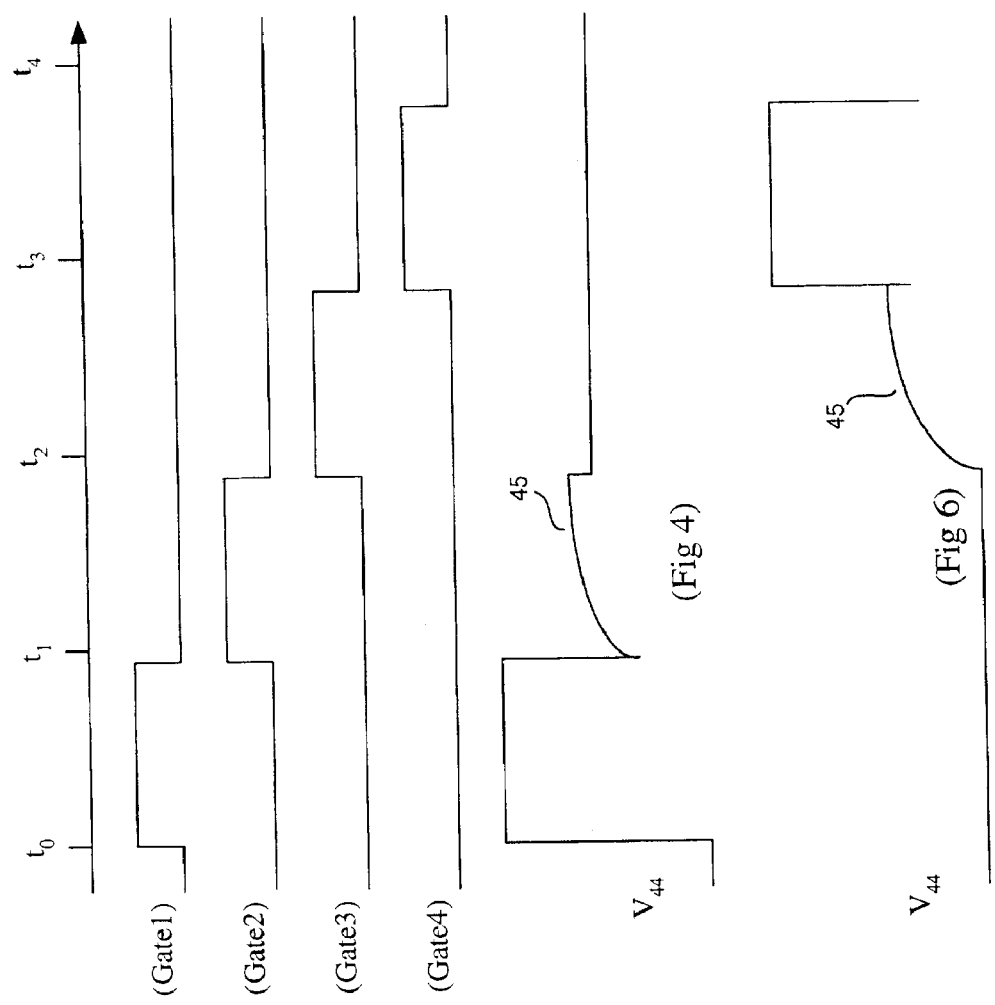
In FIG. 5 there is shown the timing diagram illustrating various signals occurring in the operation of FIGS. 4 and 6.
Figure 6:
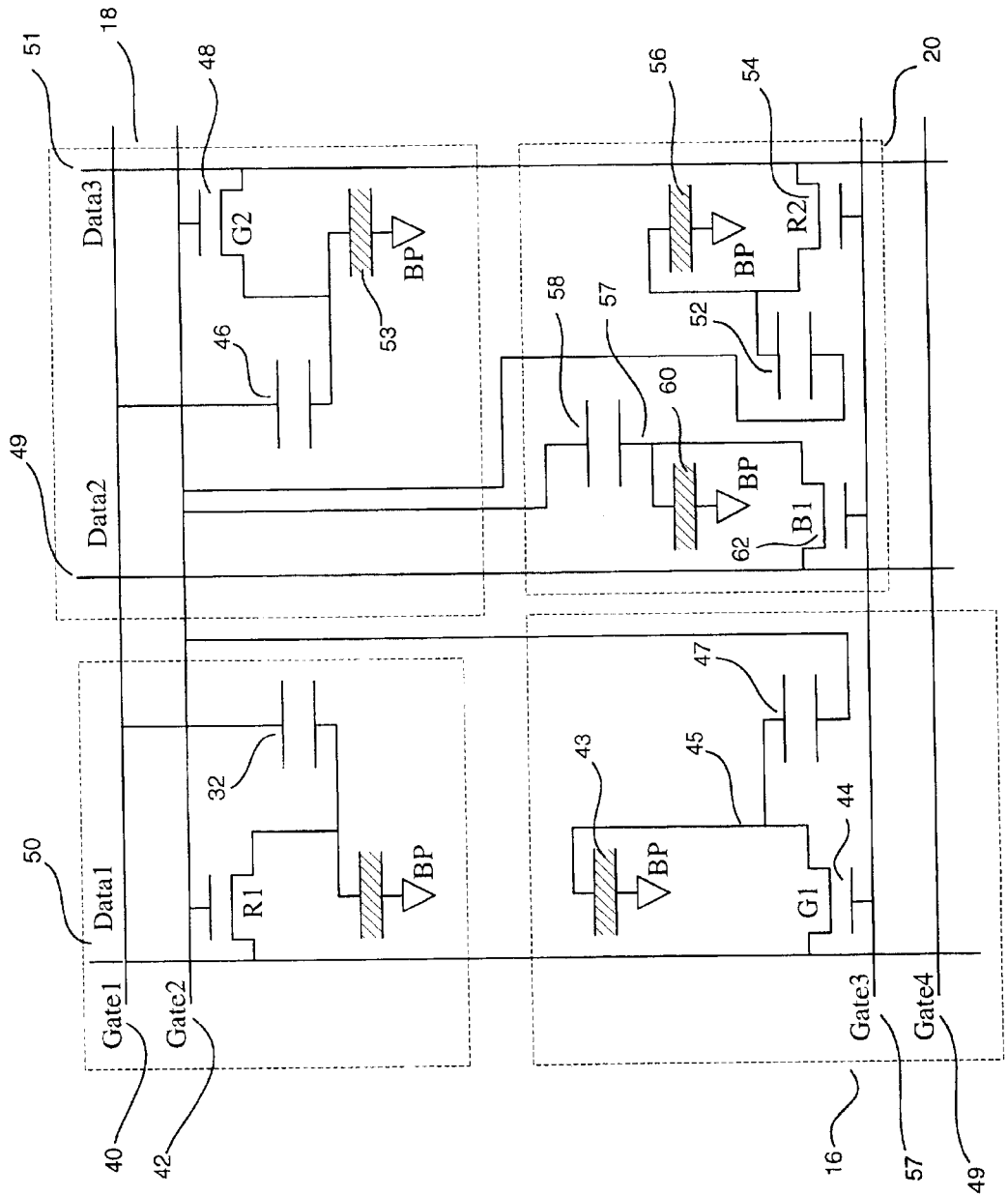
In FIG. 6 there is shown the circuit diagram for the operation of FIGS. 1, 2 and 3.

Turning now to the operation of the circuit of FIG. 6, there is shown a schematic representation of a supporting circuitry for the liquid crystal display arrangement of FIGS. 1 and 2 that avoid the previously described problems. The present invention uses existing gate lines in different order so as to ensure that a switch in the form of a transistor is not opened until after the capacitor associated therewith it is charged so that the data signal then applied corrects any unintended voltage signal applied to the LCD cell thereby minimizing or avoiding altogether unintended image artifacts. The operation is described with respect to the timing diagram of FIG. 5. As to the supporting circuitry associated with subpixel 14, transistor 30 of FIG. 3 is coupled with data line 50 (Data 1). A storage capacitor 32, in turn, is coupled to gate line 40 (Gate 1) which causes a voltage pulse to the same and LCD cell 34 at pixel node 31. The gate of transistor 30 is coupled to control line 42 (Gate 2). The voltage potential that is applied across the source and drain of transistor 30 in conjunction with voltage on gate line 40 (Gate 1) causes a leakage current and a corresponding voltage change across the liquid crystal cell 34. The control signal sent via control line 42 (Gate 2) that occurs between $t_0$ and $t_2$ is coupled to the gate of transistor 30 which, in turn, opens the transistor.

With respect to the circuit portion relevant to blue subpixel 12, storage capacitor 58 is tied to line 42 (Gate 2) which causes a voltage pulse to the same and LCD cell 60. The pulse applied at line 57 (Gate 3) thereafter opens the gate of transistor 62. The data signal from data line 49 (Data 2) occurs after the pulse applied by line 42 (Gate 2) and thereby also nullifies any voltage charge against the source and drain of transistor 62 due to leakage current from storage capacitor 58 and LCD cell 60 at node 57.

Similarly, with respect to the circuit portion pertaining to LCD subpixel 18, storage capacitor 46 is tied to gate line 40 (Gate 1) which, in turn, applies a corresponding pulse as shown in FIG. 5 between $t_0$ and $t_1$. Thereafter, gate line 42 (Gate 2) delivers a pulse to the gate of transistor of 48 between $t_1$ and $t_2$, thereby opening same and allowing the data signal from data line 57 (Data 3) through transistor 48 to be applied against LCD subcell 51 but also nullifying the effect of any previous leakage current and the unintended voltage change to the pixel node 53.

However, as to the circuit portion corresponding to subpixels 16 and 20, a different result occurs and the aforediscribed unintended image artifacts are reduced or avoided. Storage capacitor 47 and LCD cell 43 are coupled to line 42 (Gate 2) which applies the voltage pulse there across between $t_1$ and $t_2$ and thereby creating a resultant high voltage at pixel node 45 which, in turn, causes leakage current and a corresponding change in voltage at the pixel node 45. Thereafter, the pulse supplied by way of control line 57 (Gate 3) to the transistor gate of transistor 44 opens the transistor 44 thereby allowing the data signal from data line 50 (Data 1) to flow through transistor 44 thereby nullifying the voltage developed by the previously described leakage current and providing a corrected signal to LCD subcell 43.

Turning now to the circuitry associated with red subpixel component 20 of FIG. 6 while also referring to the timing diagram of FIG. 5, it will be seen that storage capacitor 52 is coupled to control line 42 (Gate 2). Thus, capacitor 52 is charged and the voltage is applied against storage capacitor 52 and LCD cell 56 thereby causing leakage current across transistor 54. However, when the signal occurring at line 57 (Gate 3), which occurs after the signal from line 42 (Gate 2), is applied at the gate of transistor 54 thereby opening the transistor, the data signal from data line 57 (Data 3) flows through transistor 54 and pixel node 71 to LCD cell 56, thereby nullifying the error voltage developed across the source and drain of transistor 54 such that the data signal applied to LCD cell 56 is not disturbed thereby avoiding the unintended image artifacts previously associated with FIG. 4.

The bottom two data signals of FIG. 5 illustrate the difference in operation between the circuitry of FIG. 4 versus FIG. 6 at node 45. The waveforms are not drawn to scale as compared to the signals shown above from lines 40–49 (Gates 14). It will thus be appreciated that effect of leakage current and the results and the poorer image quality are reduced thereby.

In this embodiment, control line 49 (Gate 4), is not used for the first pixel set. An important factor being that an existing pixel structure and the attendant circuitry can be used with different connections thereof such that each capacitor is charged before the attendant transistor is opened to receive the desired data signal. A typical time over which the pattern repeats would be 30 milliseconds.

Figure 7:
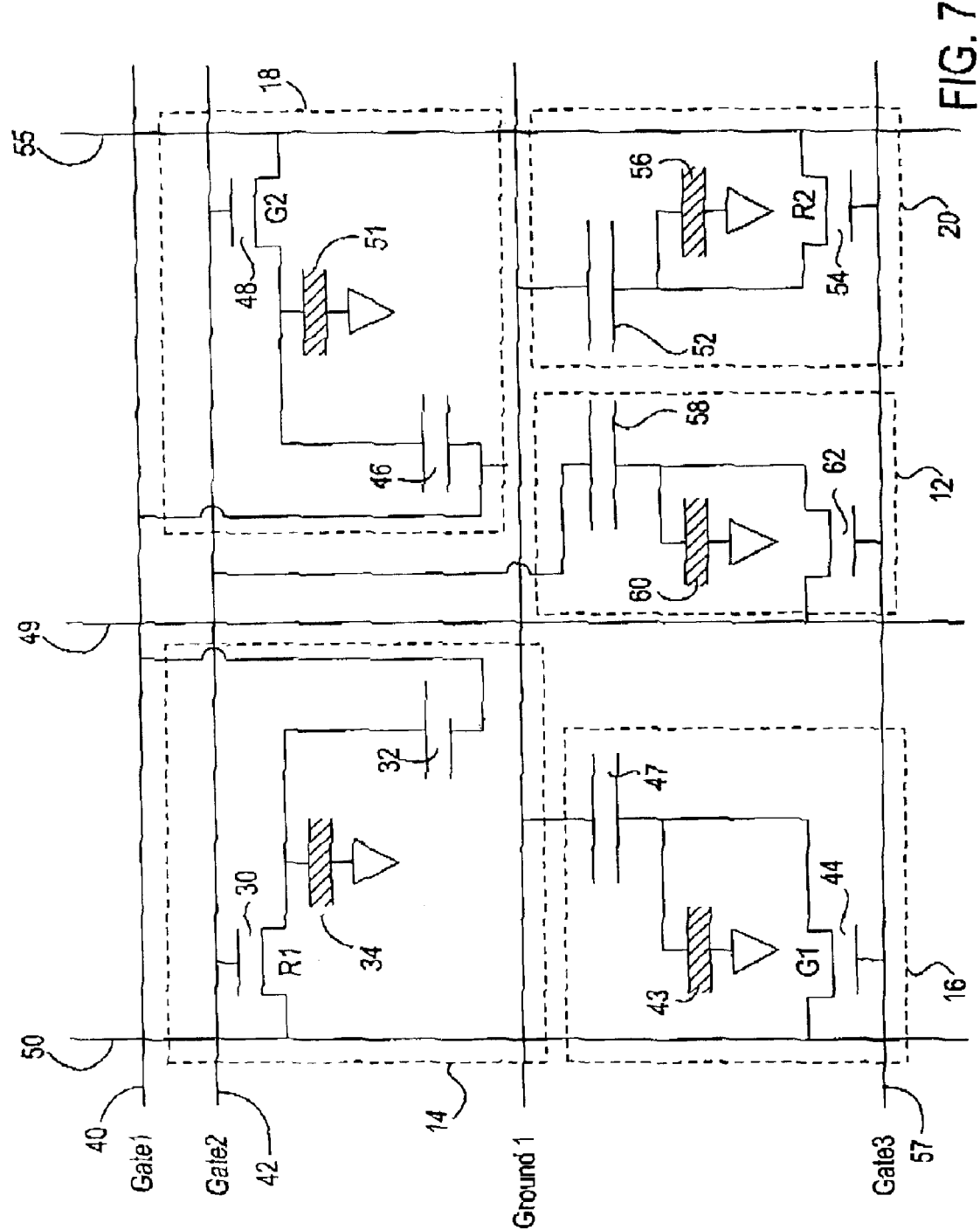
In FIG. 7 there is shown a circuit diagram for the operation of FIGS. 1, 2 and 3.

In FIG. 7 there is shown an alternative embodiment of the present invention by which the unintended image artifacts are obviated or greatly reduced by coupling the storage capacitory to ground as shown herein. Thus, with respect to the circuit component supporting red subpixel element 14 and green subpixel 18, the performance of this circuit is similar to that described before, with no artifacts. However, with respect to the other two circuit components 16 and 20, the performance is different in that no pulse is seen across the storage capacitor, so no leakage current can occur. More specifically, storage capacitors 47 and 52 are tied to ground, such that they never couple a voltage pulse to the tranistors 44 and 54 and thus no leakage current occurs. As such, when the data signals from data lines 50 (Data 1) and 57 (Data 3) are sent, there is no preexisting leakage current whose effects must be nullified and the unintended aforedescribed image distortions are thus avoided or greatly reduced.

It will be appreciated that the above described circuitry is only one way of achieving the aspects of the present invention, and that many alternative circuits may be designed by those skilled in the art, an important factor being an awareness of the timing and the elimination of undesirable leakage voltage through the corresponding transistor and the attendant undesirable image artifacts.

It will be further appreciated in view of the aforereferenced description, that devices such as televisions, computers, electronic notebooks and other devices that utilize visual displays can benefitted through use of the present invention. It will be further appreciated that the problems associated with the prior art can be avoided while still using the aforedescribed pixel structure of FIGS. 1, 2 and 3 yet with modifications that, in turn, can be manufactured by utilizing existing gate lines of such pixel structure in different orders.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the system described herein. These and other changes can be made to the invention in light of the detailed description. The elements and acts of the various embodiments described above can be combined to provide further embodiments.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

While certain aspects of the invention are presented below in certain claim forms, the inventors contemplate the various aspects of the invention in any number of claim forms. For example, while only one aspect of the invention is recited as embodied in a semiconductor chip, other aspects may likewise be embodied in a chip. Accordingly, the inventors reserve the right to add additional claims after filing the application to pursue such additional claim forms for other aspects of the invention.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A pixel display circuit comprising: a pixel matrix, the pixel matrix having a first pixel component corresponding to a first color, a second pixel component corresponding to a second color, a third pixel component corresponding to a third color, a fourth pixel component corresponding to the first color, and a fifth pixel component corresponding to the second color, each of the first, second and third pixel components being coupled to a charge storage device and an associated switching device to control activation of each selection of the pixel components, each charge storage device of the first, second and third pixel components receiving a pulse from a previous line prior to activation of the associated switching device, each of the fourth and fifth pixel components being coupled to a charge storage device and an associated switching device to control activation of each selection of the pixel components, each charge storage device of the fourth and fifth pixel components coupled to ground.

2. The pixel display circuit of claim 1 in which the switch further comprises a transistor.

3. The pixel display circuit of claim 1 in which the switch further comprises a thin film transistor.

4. The pixel display circuit of claim 1 in which the charge storage device comprises a capacitor.

5. The pixel display circuit of claim 1 in which the charge storage device comprises a thin film capacitor.

6. The pixel display circuit of claim 1 in which the first color appears substantially red, the second color appears substantially green and the third color appears substantially blue.

7. The pixel display circuit of claim 1 in which each charge storage device of the first, second and third pixel components is fully charged prior to activation of the associated switching device.

8. The pixel display circuit of claim 1 wherein the pixel display circuit is coupled to a computing device.

9. The pixel display circuit of claim 1 wherein the pixel display circuit is coupled to a video signal.

10. The pixel display circuit of claim 1 wherein the pixel display circuit is coupled to a television signal.

11. The pixel display circuit of claim 1 wherein the pixel display circuit is coupled to a thin film emissive display device.

12. The pixel display circuit of claim 1 wherein the pixel display circuit is coupled to a LCD display device.

13. An LCD pixel display having a plurality of pixels, each of the pixels having a first plurality of at least three two subpixel elements having paired gate lines, a separate subpixel element, and having a second plurality of at least two subpixel elements, a representative subpixel element of the first plurality comprising:

a capacitor; the capacitor adapted to receive a first control signal; and a switch, the switch adapted to receive a second control signal, the switch being coupled to the capacitor and the switch being coupled to the subpixel element such that the capacitor receives the first control signal before the switch receives the second control signal;

the separate subpixel element comprising:

a capacitor; the capacitor adapted to receive a second control signal; and a switch, the switch adapted to receive a third control signal the switch being coupled to the capacitor and the switch being coupled to the subpixel element such that the capacitor receives the second control signal before the switch receives the third control signal;

and a representative subpixel element of the second plurality comprising:

a capacitor; the capacitor coupled to ground; and a switch, the switch adapted to receive the third control signal, the switch being coupled to the capacitor and the switch being coupled to the subpixel element.

14. The LCD pixel display of claim 13 wherein the first control signal causes a voltage to be applied to one electrode of the capacitor.

15. The LCD pixel display of claim 14 wherein the second control signal causes the switch to change an optical output associated with the subpixel element.

16. The LCD pixel display of claim 14 wherein the plurality of pixels form an array and wherein each pixel of the array is coupled to a gate line and a data line such that control signals are transmitted to each switch via the gate line, and wherein the capacitor is coupled to a gate line associated with another pixel.

17. An LCD pixel display comprising: a plurality of pixels each pixel further comprising a first plurality of at least three subpixels with an associated paired gate line, wherein each subpixel further comprises a sample and hold circuit wherein a first charging signal is applied prior to activating the sample and hold circuit;

each pixel further comprising a second plurality of at least two subpixels with an associated gate line, wherein each subpixel further includes a charge storage device coupled to ground and a switch coupled to the associated gate line.

18. The apparatus of claim 17 above wherein said sample and hold circuit comprises a capacitor transistor arrangement associated with each subpixel and wherein said transistor is timed to open after a previous signal is applied to said capacitor.

19. In a pixel array for an LCD display having a plurality of pixels each of the pixels having a group of subpixels, a first and second of the subpixels corresponding to a first color, a third subpixel corresponding to a second color and a fourth and fifth subpixel corresponding to a third color comprising:

a first means for switching associated with the first subpixel;

a second means for switching associated with the said the second subpixel;

a third means for switching associated with said the third subpixel;

a fourth means for switching associated with the fourth subpixel;

a fifth means for switching associated with the fifth subpixel;

each of the first, second, third, fourth and fifth switching means having a corresponding means for storing a charge;

the switching means of the first; and fourth subpixel being coupled to a first gate line such that each of the switching means of the first, and fourth subpixel is closed after each of the means for storing a charge is charged and in which the gate lines are paired;

the switching means of the second and fifth subpixel being coupled to a second gate line and the storing means of the second, and fifth subpixel being coupled to ground.

20. A method for controlling an LCD pixel display having a plurality of pixels, each of the pixels of the plurality of pixels having a first plurality of subpixel elements having paired gate lines and having a second plurality of subpixel elements' having a gate line and a ground line, with a capacitor of each subpixel element of the second plurality of subpixel elements coupled to ground, comprising:

charging a capacitor with a first control signal; and activating a transistor with a second control signal, the transistor being electrically coupled to the capacitor, and the transistor being coupled to at least one of the first plurality of subpixel elements, such that the capacitor receives the first control signal before the switch receives the second control signal.

21. The LCD pixel display of claim 20 wherein the first control signal causes a voltage to be applied across the capacitor.

22. The LCD pixel display of claim 20 wherein the second control signal causes the transistor to change an optical output associated with one subpixel element of the subpixel elements.

23. The LCD pixel display of claim 20 wherein the plurality of pixels form an array and wherein each pixel of the array is coupled to a gate line and a data line such that control signals are transmitted to each switch via the gate line, and wherein the capacitor of the first plurality of subelements is coupled to a gate line associated with another pixel.

24. The LCD pixel display of claim 20 wherein each pixel of the plurality of pixels further comprises a plurality of at least five subpixels with an associated paired gate line, wherein each subpixel further comprises a sample and hold circuit.

25. A method for controlling an LCD pixel display having a plurality of pixels, each of the pixels of the plurality of pixels having a first plurality of subpixel elements, a separate subpixel element, a separate subpixel element, and a second plurality of subpixel elements, the LCD display being controlled substantially according to a clock signal, comprising:

charging a capacitor with a first control signal during a first clock period, the first clock period occurring substantially immediately before a second clock period;

activating a transistor with a second control signal during the second clock period, the transistor being electrically coupled to the capacitor, and the transistor being coupled to at least one of the subpixel elements of the first plurality of subpixel elements, the transistor coupling a data signal in the second clock cycle to at least one optical output associated with the at least one of the plurality of subpixel elements, charging a capacitor of the separate subpixel element with the second control signal during the second clock period:

activating a transistor of the separate subpixel element with a third control signal during a third clock period, the third clock period occurring substantially immediately after the second clock period, the transistor being electrically coupled to the capacitor, the transistor coupling a data signal in the third clock cycle to at least one optical output associated with the separate subpixel element, activating a transistor with the third control signal during the third clock period, the transistor being electrically coupled to a grounded capacitor, the grounded capacitor further coupled to ground, and the transistor being coupled to at least one of the subpixel elements of the second plurality of subpixel elements, the transistor coupling a data signal in the third clock cycle to at least one optical output associated with the at least one of the plurality of subpixel elements, transmitting an optical signal from the at least one optical output at least partially in response to the data signal.

26. The LCD pixel display of claim 25 wherein the first control signal causes a voltage to be applied across the capacitor.

27. The LCD pixel display of claim 25 wherein the second control signal causes-the transistor to create a potentially visible optical output associated with one subpixel element of the first plurality of subpixel elements.

28. The LCD pixel display of claim 25 wherein the plurality of pixels form an array and wherein each pixel of the array is coupled to a first gate line, a second gate line and a data line, such that the first control signal is received from the first control line coupled to the capacitor, the second control signal is received from the second control line, and the data signal is received from the data line.

29. The LCD pixel display of claim 25 wherein each pixel of the plurality of pixels further comprises a plurality of at least five subpixels with an associated paired gate line, wherein each subpixel further comprises a sample and hold circuit.

30. An apparatus for controlling an LCD pixel display having a plurality of pixels, each of the pixels of the plurality of pixels having a first plurality of subpixel elements having paired gate lines, comprising:

electrical means for charging a capacitor with a first control signal; and control means for activating a transistor with a second control signal, the transistor being electrically coupled to the capacitor, and the transistor being coupled to at least one of the plurality of subpixel elements, such that the capacitor receives the first control signal before the switch receives the second control signal;

each of the pixels of the plurality of pixels further having a separate subpixel element, comprising:

electrical means for charging a capacitor with the second control signal: and control means for activating a transistor with a third control signal, the transistor being electrically coupled to the capacitor, and the transistor being coupled to at least one of the plurality of subpixel elements, such that the capacitor receives the second control signal before the switch receives the third control signal:

each of the pixels of the plurality of pixels having a second plurality of subpixel elements, comprising:

a grounded capacitor coupled to ground; and control means for activating a transistor with the third control signal, the transistor being electrically coupled to the capacitor, and the transistor being coupled to at least one of the plurality of subpixel elements.

31. The apparatus of claim 30 wherein the electrical means causes a voltage to be applied across the capacitor.

32. The apparatus of claim 30 wherein the control means causes the transistor to change an optical output associated with one subpixel element of the first plurality of subpixel elements.

33. The apparatus of claim 30 wherein each pixel of the plurality of pixels further comprises a plurality of at least five subpixels with an associated paired gate line, wherein each subpixel further comprises a sample and hold circuit.

34. An apparatus for controlling an LCD pixel display having a plurality of pixels, each of the pixels of the plurality of pixels having a first plurality of subpixel elements and having a second plurality of subpixel elements, the LCD display being controlled substantially according to a clock signal, comprising:

charging means for charging a capacitor with a first control signal during a first clock period, the first clock period occurring substantially immediately before a second clock period;

activating means for activating a transistor with a second control signal during the second clock period, the transistor being electrically coupled to the capacitor, and the transistor being coupled to at least one of the first plurality of subpixel elements, the transistor coupling a data signal in the second clock cycle to at least one optical output associated with the at least one of the first plurality of subpixel elements, the activating means further for activating a transistor with a third control signal during a third clock period, the transistor being electrically coupled to a grounded capacitor, the grounded capacitor being coupled to ground and the transistor being coupled to at least one of the second plurality of subpixel elements, the transistor coupling a data signal in the third clock cycle to at least one optical output associated with the at least one of the second plurality of subpixel elements, light emitting means for transmitting an optical signal from the at least one optical output at least partially in response to the data signal.

35. The apparatus of claim 34 wherein the charging means causes a voltage to be applied across the capacitor.

36. The apparatus of claim 34 wherein the activating means causes the transistor to create a potentially visible optical output associated with one subpixel element of the first plurality of subpixel elements.

37. The apparatus of claim 34 wherein the plurality of pixels form an array and wherein each pixel of the array is coupled to a first gate line, a second gate line and a data line, such that the first control signal is received from the first control line coupled to the capacitor, the second control signal is received from the second control line, and the data signal is received from the data line.

38. The apparatus of claim 34 wherein each pixel of the plurality of pixels further comprises a plurality of at least five subpixels with an associated paired gate line, wherein each subpixel further comprises a sample and hold circuit.

39. An LCD pixel display having a plurality of pixels, each of the pixels having a first plurality of at least two subpixel elements having paired gate lines, and having a second plurality of at least two subpixel elements having, a representative subpixel element of the first plurality comprising:

a storage means; the storage means adapted to receive a first control signal; and a switch means, the switch means adapted to receive a second control signal, the switch means coupled to the storage means and the switch means being coupled to the subpixel element such that the storage means receives the first control signal before the switch means receives the second control signal;

a representative subpixel element of the second plurality comprising:

a grounded storage means; the storage means coupled to ground; and a switch means, the switch means adapted to receive a third control signal, the switch means coupled to the storage means and the switch means being coupled to the subpixel element.

40. The LCD pixel display of claim 39 wherein the first control signal causes a voltage to be applied to the storage means.

41. The LCD pixel display of claim 39 wherein the second control signal causes the switch means to change an optical output associated with the subpixel element.

42. The LCD pixel display of 39 wherein the plurality of pixels form an array and wherein each pixel of the array is coupled to a gate line and a data line such that control signals are transmitted to the switch means via the gate line, and wherein the storage means is coupled to a gate line associated with another pixel.

* * * * *